United States Patent
Luo et al.

(10) Patent No.: US 11,038,646 B2
(45) Date of Patent: Jun. 15, 2021

(54) TECHNIQUES AND APPARATUSES FOR SHARED REFERENCE SIGNAL TRANSMISSION AND RECEPTION

(71) Applicant: QUALCOMM Incorporated, San Diego, CA (US)

(72) Inventors: Tao Luo, San Diego, CA (US); Jing Sun, San Diego, CA (US); Heechoon Lee, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/014,940

(22) Filed: Jun. 21, 2018

(65) Prior Publication Data
US 2018/0375625 A1 Dec. 27, 2018

Related U.S. Application Data

(60) Provisional application No. 62/525,063, filed on Jun. 26, 2017.

(51) Int. Cl.
*H04L 5/00* (2006.01)
*H04B 7/06* (2006.01)
*H04B 7/0413* (2017.01)

(52) U.S. Cl.
CPC .......... *H04L 5/005* (2013.01); *H04B 7/0617* (2013.01); *H04B 7/0632* (2013.01);
(Continued)

(58) Field of Classification Search
CPC ... H04B 7/0617; H04B 7/0632; H04L 5/0051; H04L 5/0064; H04L 25/0224
See application file for complete search history.

(56) References Cited

U.S. PATENT DOCUMENTS

| 9,974,077 | B2* | 5/2018 | Sartori ................. H04W 76/14 |
| 2013/0223402 | A1* | 8/2013 | Feng ..................... H04L 5/0023 370/330 |
| 2014/0126506 | A1* | 5/2014 | Horiuchi ................ H04L 5/001 370/329 |

(Continued)

OTHER PUBLICATIONS

Ericsson: "DMRS Reuse for Data and Control", 3GPP Draft; R1-1612988 DMRS Reuse for Data and Control, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051176917, Retrieved from the Internet: URL:http://www.3gpp.org/ftp/Meetings_3GPP_SYNC/RAN1/Docs/ [retrieved on Nov. 13, 2016], 3 pages.

(Continued)

*Primary Examiner* — Shukri Taha
(74) *Attorney, Agent, or Firm* — Kevin M. Donnelly

(57) ABSTRACT

Certain aspects of the present disclosure generally relate to wireless communication. In some aspects, a device may determine a shared demodulation reference signal (DMRS) configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme. The device may transmit a DMRS based at least in part on determining the shared DMRS configuration to enable a receiver to receive the plurality of resource blocks of the channel. Numerous other aspects are provided.

24 Claims, 9 Drawing Sheets

(52) U.S. Cl.
CPC .......... *H04L 5/0051* (2013.01); *H04L 5/0064* (2013.01); *H04L 5/0073* (2013.01); *H04B 7/0413* (2013.01); *H04L 5/0007* (2013.01)

(56) References Cited

U.S. PATENT DOCUMENTS

| | | | | |
|---|---|---|---|---|
| 2014/0342746 | A1* | 11/2014 | Nakashima | H04L 5/0048 455/450 |
| 2015/0003349 | A1* | 1/2015 | Kim | H04W 72/042 370/329 |
| 2015/0373694 | A1* | 12/2015 | You | H04L 5/0051 370/329 |
| 2016/0295624 | A1* | 10/2016 | Novlan | H04W 72/04 |
| 2017/0055280 | A1* | 2/2017 | Kim | H04W 72/1278 |
| 2017/0135096 | A1* | 5/2017 | Kuchibhotla | H04W 72/0406 |
| 2017/0288835 | A1* | 10/2017 | Kim | H04L 5/0048 |
| 2017/0332359 | A1 | 11/2017 | Tsai et al. | |
| 2017/0339454 | A1* | 11/2017 | Meng | H04L 5/0051 |
| 2018/0007667 | A1* | 1/2018 | You | H04L 5/14 |
| 2018/0213438 | A1* | 7/2018 | Muraoka | H04W 72/04 |
| 2018/0317221 | A1* | 11/2018 | Yasukawa | H04W 72/0413 |
| 2019/0021019 | A1* | 1/2019 | Seo | H04W 28/08 |
| 2019/0052442 | A1* | 2/2019 | Kim | H04W 88/02 |
| 2019/0306835 | A1* | 10/2019 | Hoang | H04W 72/082 |
| 2019/0306912 | A1* | 10/2019 | Cheng | H04W 76/27 |
| 2020/0214002 | A1* | 7/2020 | Lee | H04W 76/14 |

OTHER PUBLICATIONS

Huawei et al., "Demodulation RS Design for DL Control Channel", 3GPP Draft; R1-1611209, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051175190, Retrieved from the Internet: URL:http://www.3gpp.org/ftp/Meetings_3GPP_SYNC/RAN1/Docs/ [retrieved on Nov. 13, 2016], 4 pages.

Huawei et al., "DL DMRS Design for Short TTI", 3GPP Draft; R1-1706995, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017 May 14, 2017, XP051272225,Retrieved from the Internet: URL:http://www.3gpp.org/ftp/Meetings_3GPP_SYNC/RAN1/Docs/ [retrieved on May 14, 2017], 8 pages.

Huawei et al., "Downlink Control Channel Structures", 3GPP Draft; R1-1611207, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016, XP051175188, Retrieved from the Internet: URL:http://www.3gpp.org/ftp/Meetings_3GPP_SYNC/RAN1/Docs/ [retrieved on Nov. 13, 2016], 6 pages.

Intel Corporation: "DL Design Aspects of TTI Shortening", 3GPP Draft; R1-162376, 3rd Generation Partnership Project (3GPP), Mobile Competence Centre; 650, Route Des Lucioles; F-06921 Sophia-Antipolis Cedex; France, vol. RAN WG1, No. Busan, Korea; Apr. 11, 2016-Apr. 15, 2016 Apr. 2, 2016, XP051080155, Retrieved from the Internet: URL:http://www.3gpp.org/ftp/tsg_ran/WG1_RL1/TSGR1_84b/Docs/ [retrieved on Apr. 2, 2016], 6 pages.

International Search Report and Written Opinion—PCT/US2018/038971—ISA/EPO dated Oct. 4, 2018.

* cited by examiner

TECHNIQUES AND APPARATUSES FOR SHARED REFERENCE SIGNAL TRANSMISSION AND RECEPTION

CROSS-REFERENCE TO RELATED APPLICATIONS UNDER 35 U.S.C. § 119

This application claims priority to U.S. Patent Application No. 62/525,063, filed on Jun. 26, 2017, entitled "TECHNIQUES AND APPARATUSES FOR SHARED REFERENCE SIGNAL TRANSMISSION AND RECEPTION," which is hereby expressly incorporated by reference herein.

FIELD OF THE DISCLOSURE

Aspects of the present disclosure generally relate to wireless communication, and more particularly to techniques and apparatuses for shared reference signal transmission and reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include determining, by a device, a shared demodulation reference signal (DMRS) configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme. The method may include transmitting, by the device, a DMRS based at least in part on determining the shared DMRS configuration to enable a receiver to receive the plurality of resource blocks of the channel.

In some aspects, a device for wireless communication may include a memory and at least one processor coupled to the memory. The memory and the at least one processor may be configured to determine a shared DMRS configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme. The memory and the at least one processor may be configured to transmit a DMRS based at least in part on determining the shared DMRS configuration to enable a receiver to receive the plurality of resource blocks of the channel.

In some aspects, a non-transitory computer-readable medium may store one or more instructions for wireless communication. The one or more instructions, when executed by one or more processors, may cause the one or more processors to determine a shared DMRS configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme. The one or more instructions, when executed by the one or more processors, may cause the one or more processors to transmit a DMRS based at least in part on determining the shared DMRS configuration to enable a receiver to receive the plurality of resource blocks of the channel.

In some aspects, an apparatus for wireless communication may include means for determining a shared DMRS configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme. The apparatus may include means for transmitting a DMRS based at least in part on determining the shared DMRS configuration to enable a receiver to receive the plurality of resource blocks of the channel.

In some aspects, a method for wireless communication may include determining, by a device, a search space configuration for a search space associated with a plurality of resource blocks of a channel, wherein a frequency domain associated with the plurality of resource blocks overlaps for a control resource of the channel and a data resource of the channel. The method may include receiving, by the device, a DMRS common to the control resource and the data resource. The method may include determining, by the device, the control resource and the data resource using the DMRS common to the control resource and the data resource.

In some aspects, a device for wireless communication may include a memory and at least one processor coupled to the memory. The memory and the at least one processor may be configured to determine a search space configuration for a search space associated with a plurality of resource blocks of a channel, wherein a frequency domain associated with the plurality of resource blocks overlaps for a control resource of the channel and a data resource of the channel. The memory and the at least one processor may be configured to receive a DMRS common to the control resource and the data resource. The one or more processors may be configured to determine the control resource and the data resource using the DMRS common to the control resource and the data resource.

In some aspects, a non-transitory computer-readable medium may store one or more instructions for wireless communication. The one or more instructions, when executed by one or more processors of a device, may cause the one or more processors to determine a search space configuration for a search space associated with a plurality of resource blocks of a channel, wherein a frequency domain associated with the plurality of resource blocks overlaps for a control resource of the channel and a data resource of the channel. The one or more instructions, when executed by the one or more processors, may cause the one or more processors to receive a DMRS common to the control resource and the data resource. The one or more instructions, when executed by the one or more processors, may cause the one or more processors to determine the control resource and the data resource using the DMRS common to the control resource and the data resource.

In some aspects, an apparatus for wireless communication may include means for determining a search space configuration for a search space associated with a plurality of resource blocks of a channel, wherein a frequency domain associated with the plurality of resource blocks overlaps for a control resource of the channel and a data resource of the channel. The apparatus may include means for receiving a DMRS common to the control resource and the data resource. The apparatus may include means for determining the control resource and the data resource using the DMRS common to the control resource and the data resource.

Aspects generally include a method, apparatus, device, computer program product, non-transitory computer-readable medium, user equipment, wireless communication device, base station, and access point as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
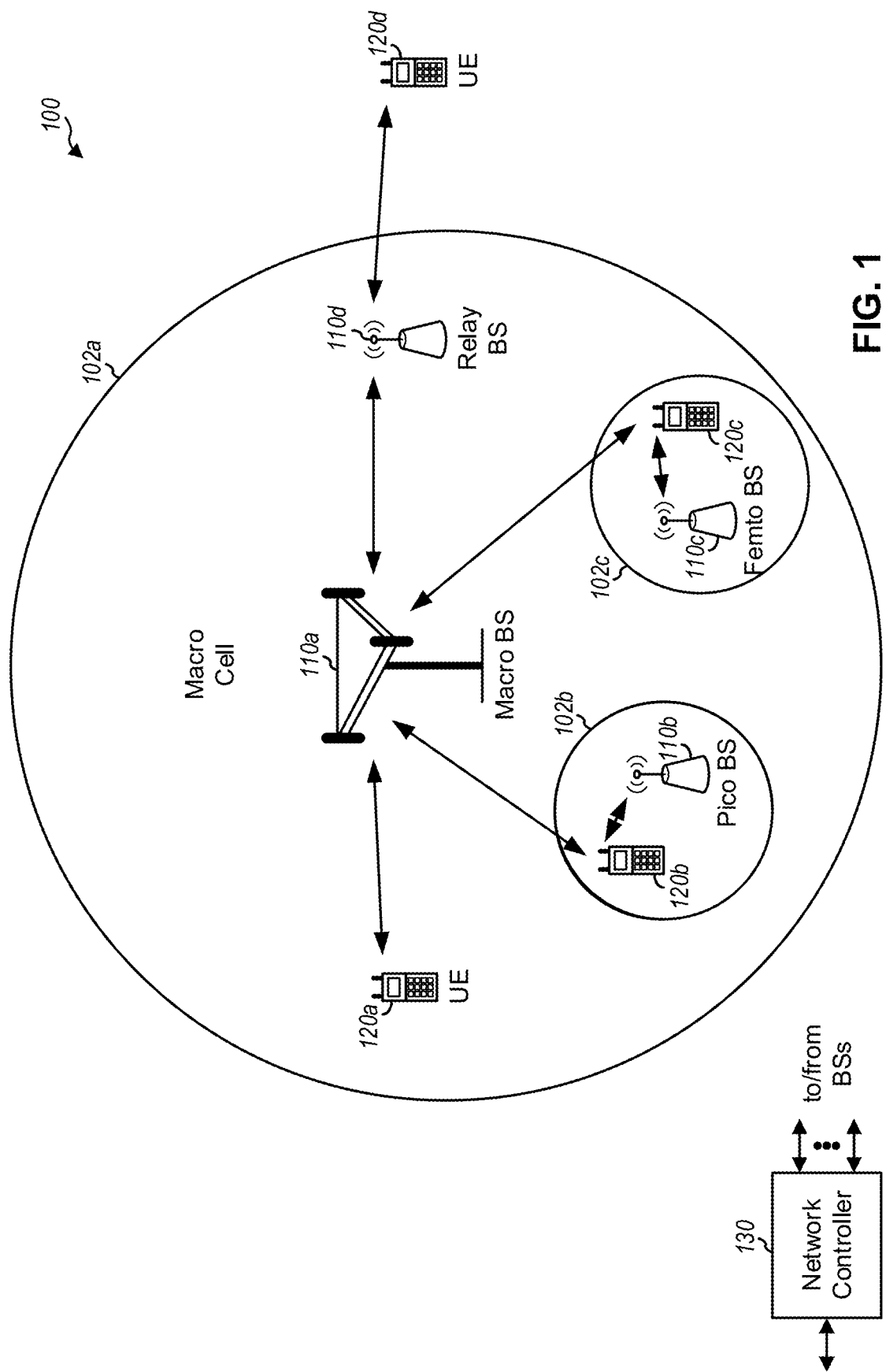
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
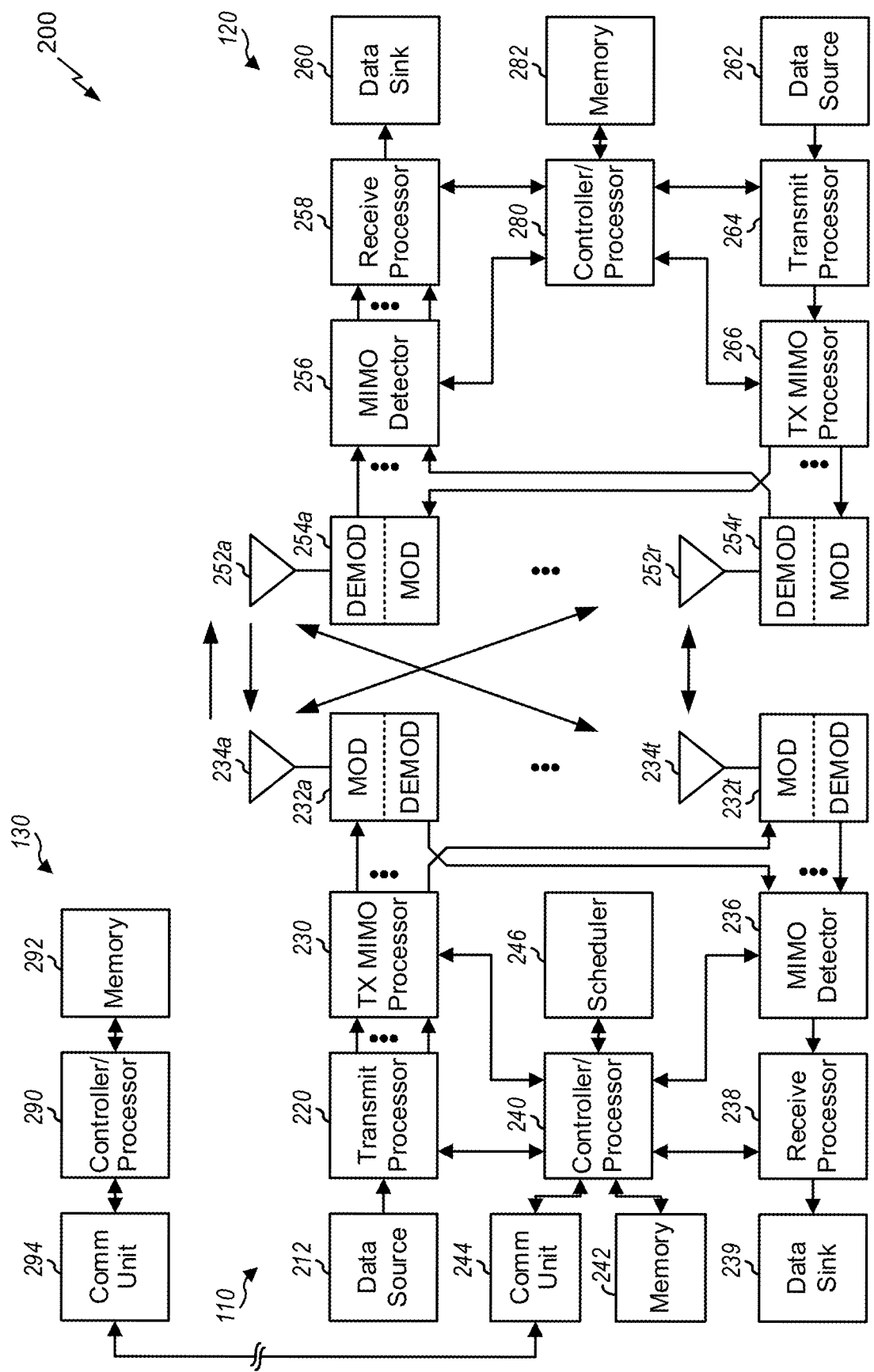
FIG. 2 shows a block diagram conceptually illustrating an example of a base station in communication with a user equipment (UE) in a wireless communication network, in accordance with certain aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with shared reference signal transmission and reception, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, a device (e.g., base station 110, UE 120, and/or the like) may include means for determining a shared demodulation reference signal (DMRS) configuration for a plurality of resource blocks of a channel, wherein a frequency domain associated with the plurality of resource blocks overlaps for a control resource of the channel and a data resource of the channel, and wherein the plurality of resource blocks are associated with a shared precoding scheme; means for transmitting a DMRS based at least in part on determining the shared DMRS configuration to enable a receiver to receive the plurality of resource blocks of the channel; and/or the like. In some aspects, such means may include one or more components of base station 110, UE 120, and/or the like described in connection with FIG. 2.

In some aspects, a device (e.g., base station 110, UE 120, and/or the like) may include means for determining a search space configuration for a search space associated with a plurality of resource blocks of a channel, wherein a frequency domain associated with the plurality of resource blocks overlaps for a control resource of the channel and a data resource of the channel; means for receiving a demodulation reference signal (DMRS) common to the control resource and the data resource; means for determining the control resource and the data resource using the DMRS common to the control resource and the data resource; and/or the like. In some aspects, such means may include one or more components of base station 110, UE 120, and/or the like described in connection with FIG. 2.

As indicated above, FIG. 2 is provided merely as an example. Other examples are possible and may differ from what was described with regard to FIG. 2.

Figure 3:
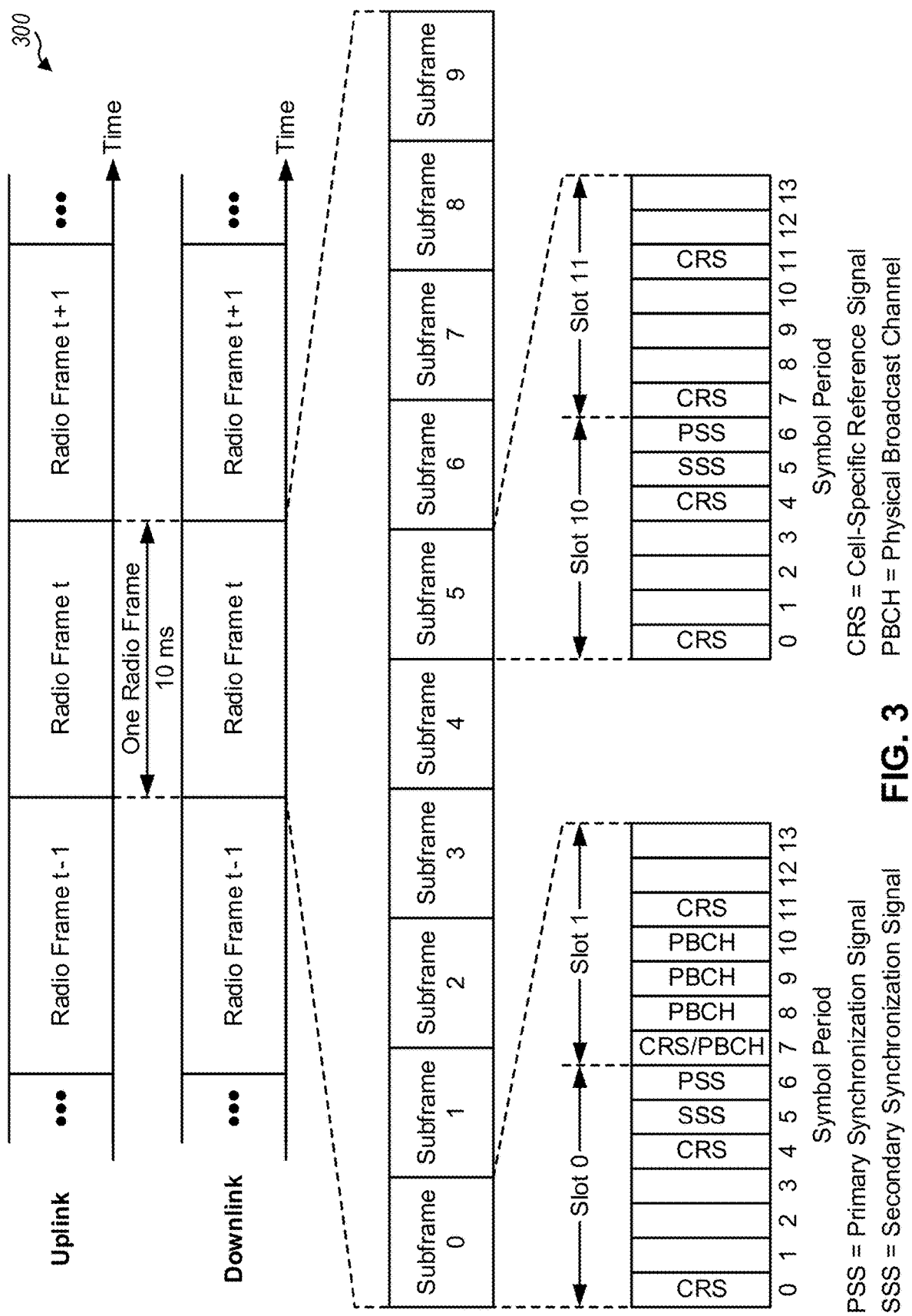
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
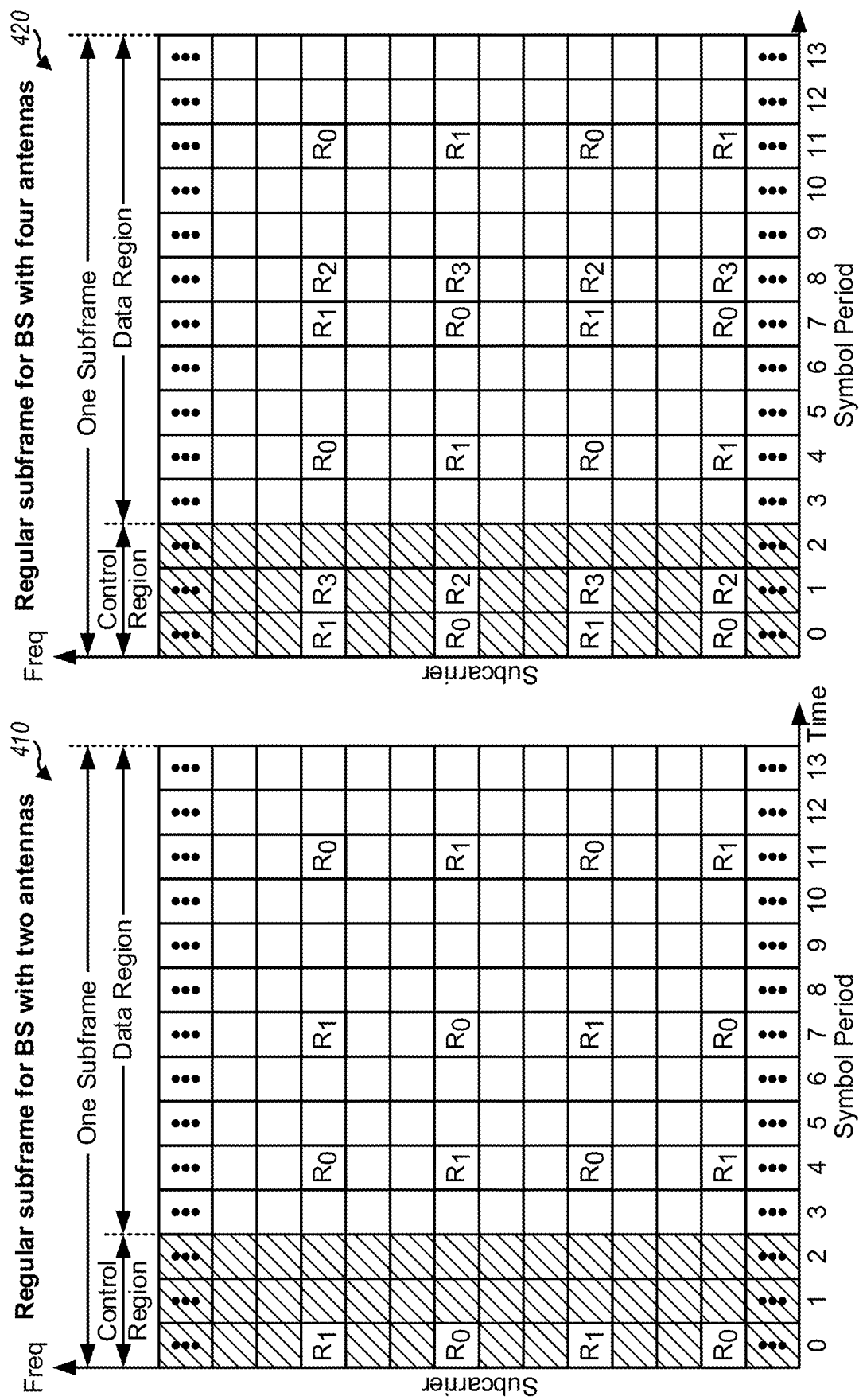
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

In certain telecommunications systems, a channel may be transmitted in a subset of available bandwidth. For example, a control resource of the channel may be assigned to one or more symbols of the available bandwidth, and may be transmitted to convey control information, such as downlink control information (DCI). A data resource may be transmitted in another subset of the available bandwidth. The data resource may be associated with a particular type of precoding based at least in part on a type of transmission of the data channel. For example, a base station may transmit a cell broadcast channel using a first type of precoding scheme, a group broadcast channel using a second type of precoding scheme, a unicast channel with UE-specific beamforming using a third type of precoding scheme, and/or the like. A similar precoding scheme may be applied across a plurality of resource blocks. For example, for a broadcast channel, a plurality of resource blocks may utilize a common precoding scheme to reduce a utilization of computing resources by a UE, which receives the broadcast channel, to perform a channel estimation procedure to recover data transmitted in the broadcast channel.

Different precoding schemes may be applied to a control resource of a channel and to an associated data resource of the channel in a common set of resource blocks. For example, for a unicast data channel, a base station may utilize a first beam width for a control channel portion of a channel, which conveys a control resource, and a second beam width for a data channel portion of the channel, which conveys a data resource. In this case, each channel portion (e.g., the control channel portion and the associated data channel portion) may be associated with a corresponding, different demodulation reference signal (DMRS) to enable channel estimation for each channel portion (sometimes referred to generally as a channel).

However, in some cases, a control channel portion and an associated data channel portion may be associated with a common precoding scheme for a group of resource blocks that overlap the control channel resource conveying control information and the associated data channel portion conveying data. In some aspects, described herein, a shared reference signal, such as a DMRS and/or the like, may be transmitted to enable reception of resource blocks of a channel that include a control resource and a data resource. In this way, a device may reduce an amount of network overhead associated with the channel relative to transmitting a plurality of reference signals for a plurality of resources of the channel (e.g., the control resource, the data resource, and/or the like), thereby improving network performance.

Figure 5:
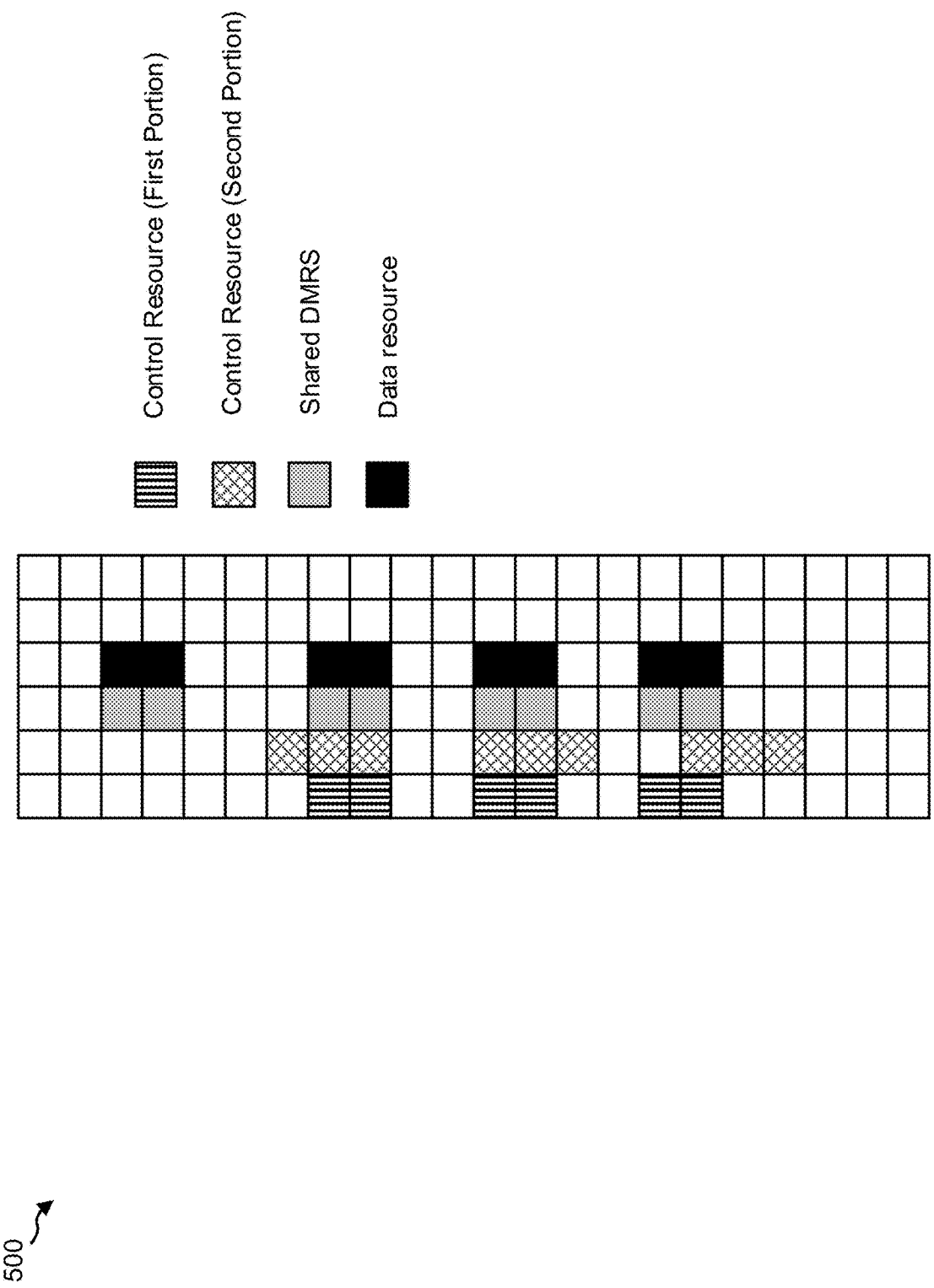
FIG. 5 illustrates an example resource allocation for a shared demodulation reference signal (DMRS).

FIG. 5 is a diagram illustrating an example 500 of a resource allocation for a shared demodulation reference signal (DMRS), in accordance with various aspects of the present disclosure.

As shown in FIG. 5, a resource allocation may include a first plurality of resource blocks allocated for a first portion of a control resource, a second plurality of resource blocks allocated for a second portion of a control resource, a third plurality of resource blocks allocated for a shared DMRS, and a fourth plurality of resource blocks allocated for a data resource associated with the shared DMRS. The shared DMRS may be provided to enable channel estimation and decoding for the first portion of the control resource and the data resource. For example, the first portion of the control resource may not be associated with a DMRS, and may be decoded using the shared DMRS. In contrast, the second portion of the control resource may be associated with another DMRS specific to and conveyed using resource blocks allocated to the second portion of the control resource. The first portion of the control resource and the second portion of the control resource may be control channels configured to share a common subset of a frequency domain resource, but may be associated with different precoding schemes. Although some aspects, described herein, are described in terms of a resource allocation of resource blocks, some aspects, described herein, may be used for another resource allocation, such as a resource allocation of resource element groups (REGs) and/or the like.

With regard to FIG. 5, the first portion of the control resource may be associated with a first precoding scheme and a first DMRS configuration for the first precoding scheme. The second portion of the control resource may be associated with a second precoding scheme and a second DMRS configuration for the second precoding scheme. The data resource may also be associated with the first precoding scheme and the first DMRS configuration. As a result, a device (e.g., a UE, such as UE 120, a BS, such as base station 110, and/or the like) may configure a DMRS resource between the control resources and the data resource to be a shared DMRS based at least in part on the first DMRS configuration, thereby enabling a receiver (e.g., another device) to utilize the shared DMRS to receive both the first portion of the control resource and the data resource. In this way, the device reduces a utilization of network resources relative to providing separate DMRSs for the first portion of the control resource and for the data resource (e.g., a first DMRS for the control resource and a second DMRS for the data resource). The shared DMRS also reduces complexity of channel estimation, by enabling a single channel estimation to be performed, thereby reducing utilization of resources of the receiver (as the receiver can use the shared DMRS for channel estimation and decoding for both the first portion of the control resource and the data resource).

As indicated above, FIG. 5 is provided as an example. Other examples are possible and may differ from what was described with respect to FIG. 5.

Figure 6:
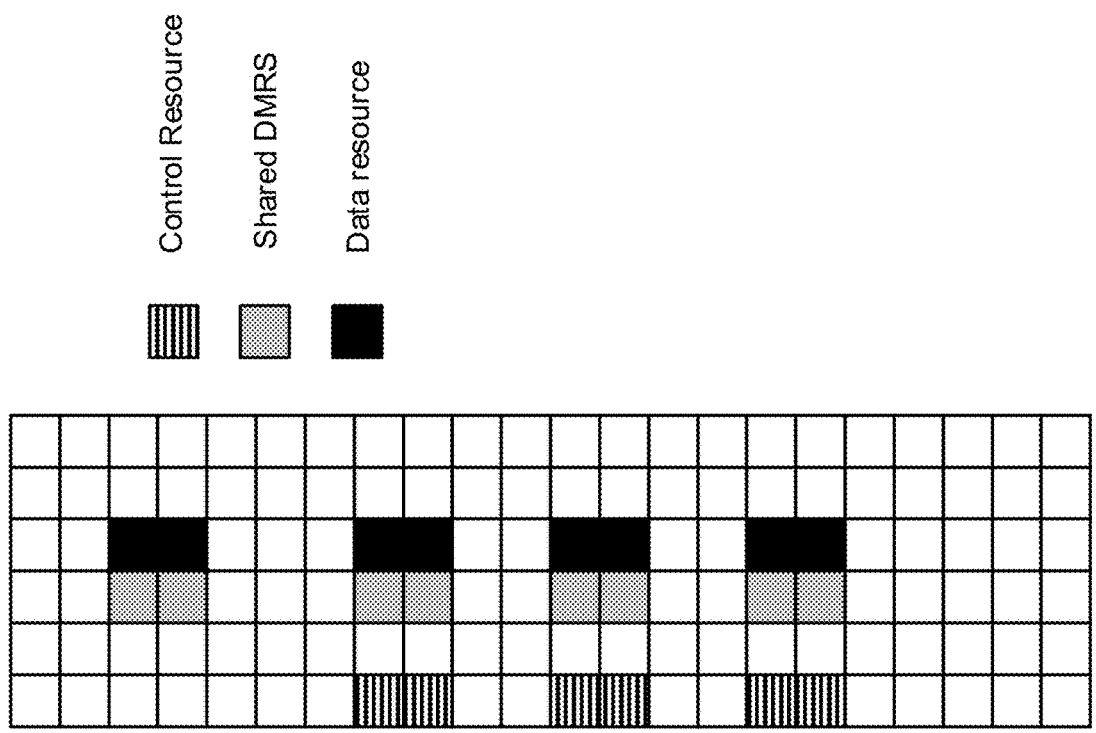
FIG. 6 illustrates another example resource allocation for a shared DMRS.

FIG. 6 is a diagram illustrating an example 600 of a resource allocation for a shared demodulation reference signal (DMRS), in accordance with various aspects of the present disclosure.

As shown in FIG. 6, a resource allocation may include a first plurality of resource blocks allocated for a control resource, a second plurality of resource blocks allocated for a shared DMRS, and a third plurality of resource blocks allocated for a data resource. In some aspects, the control resource may not be associated with a control resource-specific DMRS. For example, the shared DMRS may be common to the control resource and the data resource. In this case, the control resource may be a subset of resources used for data transmission. Alternatively, the control resource may be associated with a DMRS, such as a sparse DMRS (e.g., a DMRS for a sparse channel estimation procedure). For example, the control resource may be associated with a first DMRS that may be used for a portion of the control resource and a second, shared DMRS that may be used for another portion of the control resource.

As indicated above, FIG. 6 is provided as an example. Other examples are possible and may differ from what was described with respect to FIG. 6.

Figure 7:
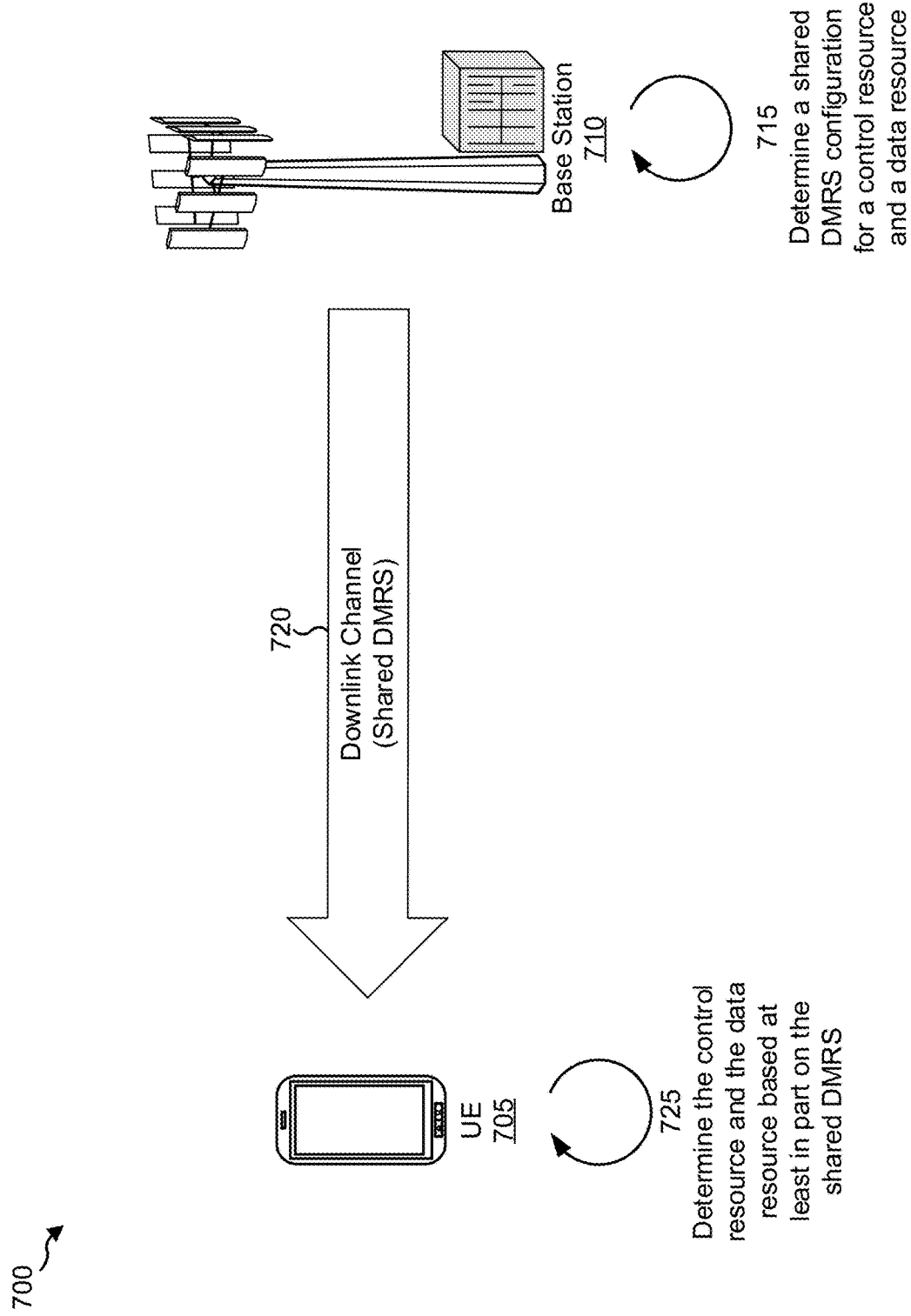
FIG. 7 is a diagram illustrating an example of shared reference signal transmission and reception, in accordance with various aspects of the present disclosure.

FIG. 7 is a diagram illustrating an example 700 of shared reference signal transmission and reception, in accordance with various aspects of the present disclosure. As shown in FIG. 7, example 700 may include a UE 705 (e.g., which may correspond to UE 120) and a base station 710 (e.g., which may correspond to base station 110). Although some aspects, described herein, are described in terms of a DMRS for a downlink transmission by a base station, some aspects, described herein, may be used for a DMRS for an uplink transmission by a UE.

As further shown in FIG. 7, and by reference number 715, base station 710 may determine a DMRS configuration (e.g., a shared DMRS configuration) for a control resource and a data resource. For example, base station 710 may determine a common precoding scheme to apply to the control resource and the data resource in a channel (e.g., a downlink channel), and may determine a DMRS configuration for the common precoding scheme to enable UE 705 to perform channel estimation and decoding to receive the channel. In this case, the DMRS configuration may relate to a downlink DMRS. In some aspects, when the channel is an uplink channel transmitted by, for example, UE 705, the DMRS configuration may relate to an uplink DMRS.

In some aspects, base station 710 may determine the DMRS configuration based at least in part on a type of transmission for the control resource and the data resource. For example, base station 710 may determine a first DMRS configuration for a broadcast channel (e.g., based at least in part on a first beam width for the broadcast channel). In contrast, base station 710 may determine a second DMRS configuration for a paging channel (e.g., based at least in part on a second beam width for the paging channel). In contrast, base station 710 may determine a third DMRS configuration for a shared channel (e.g., based at least in part on a third beam width for the shared channel).

In some aspects, base station 710 may determine the DMRS configuration based at least in part on a search space. For example, base station 710 may determine a first DMRS configuration for a common search space that shares a DMRS with an associated physical downlink shared channel (PDSCH). In contrast, base station 710 may determine a second DMRS configuration for a UE-specific search space with a DMRS in a common symbol with the UE-specific search space. In contrast, base station 710 may determine a third DMRS configuration for a UE-specific search space with a DMRS not in a common symbol with the UE-specific search space.

In some aspects, base station 710 may define the control resource for the channel. For example, base station 710 may determine that the control resource (e.g., a control resource associated with no DMRS or with a sparse DMRS) can be transmitted with a precoding scheme that is common to the control resource and the data resource. In this case, base station 710 may determine to include the control resource in the channel to provide control information, such as downlink control information (DCI) for UE 705. In some aspects, base station 710 may constrain the control resource to a subset of resources for the data resource. For example, base station 710 may determine to include the control resource in one or more resource blocks for which a frequency domain overlaps with a frequency domain of one or more resource blocks allocated to the data resource. In this case, base station 710 may determine to constrain the control resource to a quantity of layers that is common to the control resource and the data resource. Alternatively, base station 710 may determine to constrain the control resource to a subset of layers and/or codewords of the data resource.

As further shown in FIG. 7, and by reference number 720, base station 710 may transmit a channel (e.g., a downlink channel) with a DMRS (e.g., a shared DMRS for a control resource and a data resource) to UE 705, and UE 705 may receive the channel with the DMRS. In some aspects, UE 705 may transmit an uplink channel with a DMRS to base station 710. In some aspects, base station 710 may transmit the channel with the DMRS based at least in part on applying a common precoding to a plurality of resource blocks for which a frequency domain overlaps for the control resource of the channel and the data resource of the channel. For example, base station 710 may apply the common precoding scheme, and may transmit the channel to UE 705, and UE 705 may perform channel estimation and decoding using the DMRS configured based at least in part on the common precoding scheme.

In some aspects, base station 710 may apply the common precoding scheme to a layer and/or a codeword common to the control resource and the data resource. For example, the layers and/or the codewords that convey the control resource and the data resource may use the common precoding scheme. In some aspects, base station 710 may determine at least one symbol for the DMRS. For example, base station 710 may assign bits of the DMRS to at least one symbol for transmission to UE 705. In some aspects, at least a portion of the data resource may be included in a symbol that is common to the portion of the data resource and the DMRS.

As further shown in FIG. 7, and by reference number 725, UE 705 may perform channel estimation and decoding for the control resource and the data resource based at least in part on the DMRS. For example, UE 705 may determine a location of the DMRS, may receive the DMRS, and may use the DMRS to perform channel estimation and decoding for the control resource and the data resource. Alternatively, when the channel is an uplink channel, base station 710 may receive the DMRS and use the DMRS. In some aspects, UE 705 may perform a channel estimation procedure to determine the control resource and the data resource. For example, UE 705 may perform the channel estimation and decoding of the channel to determine the control resource and the data resource.

In some aspects, UE 705 may determine a location of the based at least in part on a system bandwidth. For example, the DMRS may be provided at a center bandwidth of the system bandwidth allocated to channel. In some aspects, UE 705 may determine the location of the DMRS based at least in part on a resource location of a search candidate in the channel. For example, based at least in part on a location of the control resource and/or the data resource in the channel, UE 705 may determine to receive the DMRS in at least one resource block associated with a frequency domain overlapping for the control resource and/or the data resource.

As indicated above, FIG. 7 is provided as an example. Other examples are possible and may differ from what was described with respect to FIG. 7.

Figure 8:
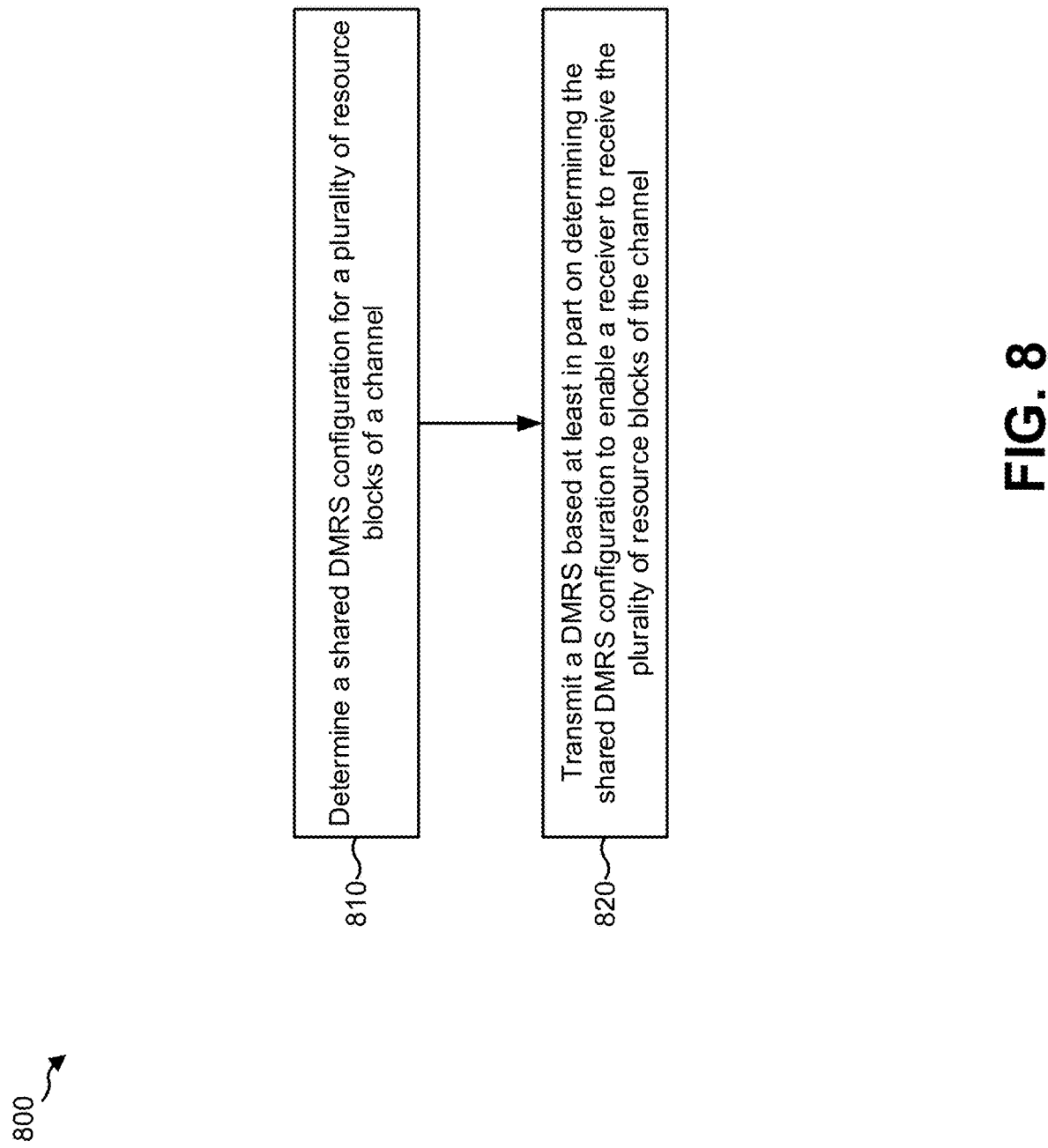
FIG. 8 is a diagram illustrating an example process performed, for example, by a device, in accordance with various aspects of the present disclosure.

FIG. 8 is a diagram illustrating an example process 800 performed, for example, by a device, in accordance with various aspects of the present disclosure. Example process 800 is an example where a device (e.g., which may correspond to one of UE 120, UE 705, base station 110, base station 710, and/or the like) performs shared reference signal transmission.

As shown in FIG. 8, in some aspects, process 800 may include determining a shared demodulation reference signal (DMRS) configuration for a plurality of resource blocks of a channel (block 810). For example, the device may determine a DMRS configuration, common to a control resource of a channel and a data resource of the channel, for a plurality of resource blocks for which a frequency domain overlaps for the control resource and the data resource. In some aspects, the plurality of resource blocks are associated with a shared precoding scheme.

In some aspects, the control resource is defined for at least one channel. In some aspects, the control resource is not associated with another DMRS or is associated with a sparse DMRS. In some aspects, the control resource is a subset of the data resource. In some aspects, the control resource and the data resource are associated with a common quantity of layers. In some aspects, a quantity of layers or codewords for the control resource is a subset of a quantity of layers or codewords of the data resource.

In some aspects, the DMRS configuration is associated with a type of transmission of the channel. In some aspects, the channel includes a broadcast channel, a paging channel, a shared channel, and/or the like. In some aspects, the DMRS configuration is associated with a search space. In some aspects, the control resource comprises a first control resource with a particular frequency domain resource and a second control resource sharing at least a portion of the particular frequency domain resource, and the first control resource is associated with the DMRS and the second control resource is associated with another DMRS that is different from the DMRS.

As further shown in FIG. 8, in some aspects, process 800 may include transmitting a DMRS based at least in part on determining the shared DMRS configuration to enable a receiver to receive the plurality of resource blocks of the channel (block 820). For example, the device may transmit the DMRS, which is configured based at least in part on the DMRS configuration common to the control resource and the data resource. In this way, the device may enable the receiver (e.g., which may correspond to one of UE 120, UE 705, base station 110, base station 710, and/or the like) to receive the plurality of resource blocks of the channel and determine the control resource and the data resource.

In some aspects, the DMRS is a downlink DMRS or an uplink DMRS. In some aspects, the DMRS is transmitted using at least one symbol of the channel. In some aspects, the DMRS is transmitted using at least one symbol of the channel and the at least one symbol of the channel includes at least a portion of the data resource.

Process 800 may include additional aspects, such as any single aspect or any combination of aspects described above and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
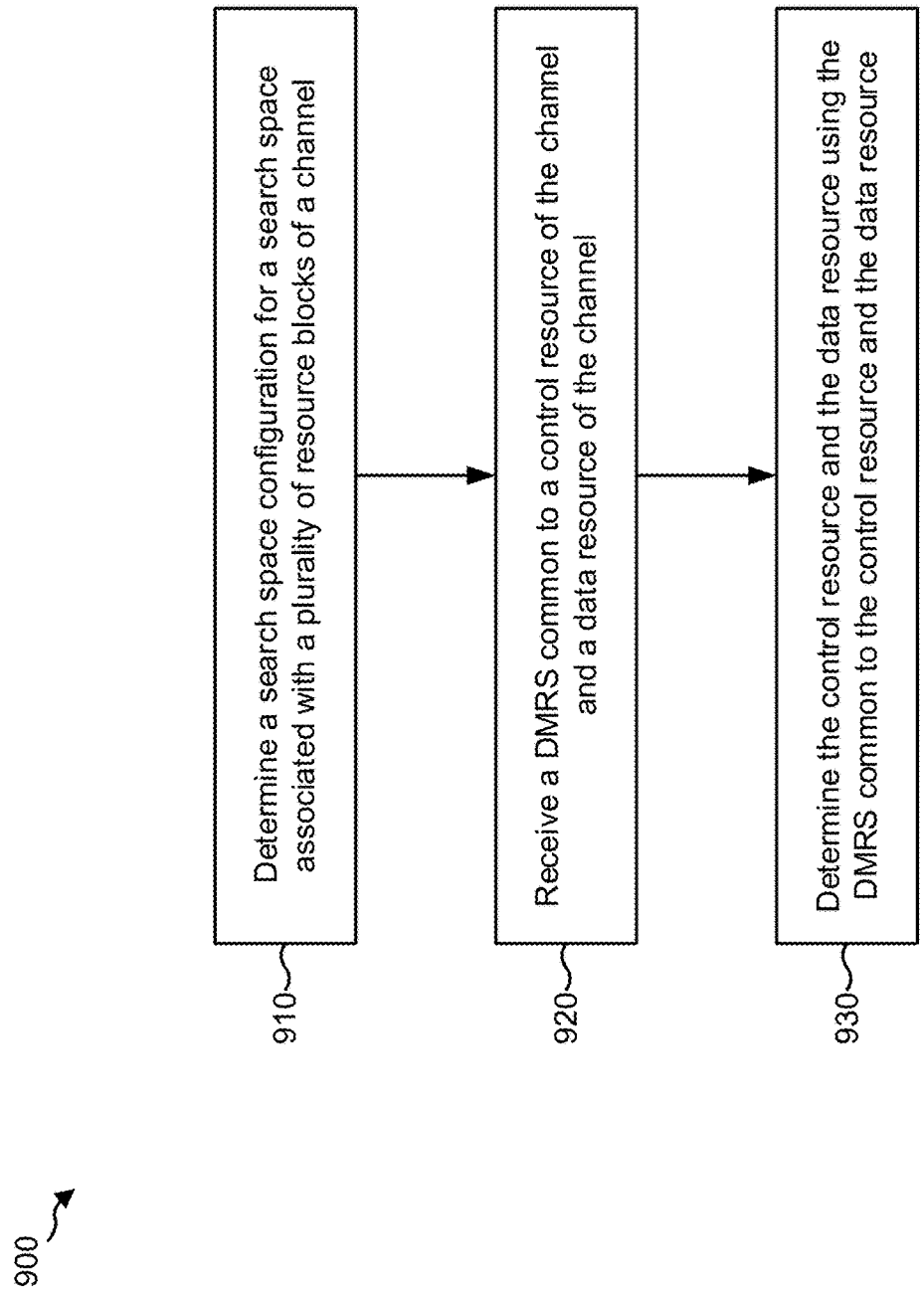
FIG. 9 is a diagram illustrating another example process performed, for example, by a device, in accordance with various aspects of the present disclosure.

FIG. 9 is a diagram illustrating an example process 900 performed, for example, by a device, in accordance with various aspects of the present disclosure. Example process 900 is an example where a device (e.g., which may correspond to one of UE 120, UE 705, base station 110, base station 710, and/or the like) performs shared reference signal reception.

As shown in FIG. 9, in some aspects, process 900 may include determining a search space configuration for a search space associated with a plurality of resource blocks of a channel (block 910). For example, the device may determine the search space configuration for the search space of a channel that includes a plurality of resource blocks, for which a frequency domain overlaps for a control resource of the channel and a data resource of the channel.

As shown in FIG. 9, in some aspects, process 900 may include receiving a demodulation reference signal (DMRS) common to a control resource of the channel and a data resource of the channel (block 920). For example, the device may receive the DMRS in the plurality of resource blocks for which the frequency domain overlaps for the control resource of the channel and the data resource of the channel. In some aspects, the channel is common for data demodulation and data decoding.

In some aspects, the DMRS is a downlink DMRS or an uplink DMRS. In some aspects, a location of the DMRS for the search space is determined based at least in part on a system bandwidth. In some aspects, a location of the DMRS for the search space is determined based at least in part on a resource location of a search candidate for the search space.

As shown in FIG. 9, in some aspects, process 900 may include determining the control resource and the data resource using the DMRS common to the control resource and the data resource (block 930). For example, the device may determine the control resource and the data resource using the DMRS that is common to the control resource and the data resource. In some aspects, the determining the control resource and the data resource includes performing a channel estimation procedure to perform decoding of the channel.

Process 900 may include additional aspects, such as any single aspect or any combination of aspects described above and/or in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a transmitter, comprising:

determining to constrain a set of control resource blocks to a quantity of layers that is common to the set of control resource blocks and data resource blocks;

determining a shared demodulation reference signal (DMRS) configuration for a plurality of resource blocks based on determining to constrain the set of control resource blocks to the quantity of layers that is common to the set of control resource blocks and the data resource blocks, the plurality of resource blocks including the set of control resource blocks including resource elements carrying control information, the data resource blocks including resource elements carrying data, and shared DMRS resource blocks including resource elements carrying a shared DMRS, the shared DMRS configuration configuring the shared DMRS resource blocks such that each control resource block of the set of the control resource blocks overlaps in frequency with a shared DMRS resource block of the shared DMRS resource blocks and at least one data resource block of the data resource blocks, wherein the set of control resource blocks, the respective shared DMRS resource blocks and the respective data resource blocks are associated with a shared precoding scheme, and wherein the shared DMRS resource blocks are configured to enable a receiver to perform a channel estimation and to decode the set of control resource blocks and the data resource blocks based on the shared DMRS; and transmitting the plurality of resource blocks based on the shared DMRS configuration.

2. The method of claim 1, wherein the shared DMRS resource blocks are included in a downlink DMRS or an uplink DMRS.

3. The method of claim 1, wherein the control resource blocks are defined for at least one channel.

4. The method of claim 1, wherein the set of control resource blocks is not associated with any other DMRS or is associated with a sparse DMRS, and wherein the control resource blocks further include a second set of control resource blocks carrying different control information than the control information carried in the set of control resource blocks, the second set of control resource blocks being associated with a different DMRS than the shared DMRS.

5. The method of claim 1, wherein the set of control resource blocks are a subset of the data resource blocks.

6. The method of claim 1, wherein the set of control resource blocks and the data resource blocks are associated with a common quantity of layers.

7. The method of claim 1, wherein a quantity of layers or codewords for the set of control resource blocks is a subset of a quantity of layers or codewords of the data resource blocks.

8. The method of claim 1, wherein at least one of the plurality of resource blocks includes a symbol that includes both resources elements for the shared DMRS and data resources elements for the data.

9. The method of claim 1, wherein the DMRS configuration is associated with a type of transmission of the channel.

10. The method of claim 1, wherein the channel is at least one of:
a broadcast channel,
a paging channel, or
a shared channel.

11. The method of claim 1, wherein the DMRS configuration is associated with a search space.

12. A method of wireless communication performed at a receiver comprising:
determining a location of a shared demodulation reference signal (DMRS) for a search space based at least in part on a resource location of a search candidate for the search space;
receiving a plurality of resource blocks over a wireless channel, the plurality of resource blocks including control resource blocks including resource elements carrying control information, data resource blocks including resource elements carrying data, and shared DMRS resource blocks including resource elements carrying the shared DMRS, the shared DMRS resource blocks being configured such that each control resource block of a set of the control resource blocks overlaps in frequency with a shared DMRS resource block of the shared DMRS resource blocks and at least one data resource block of the data resource blocks, wherein the set of control resource blocks, the respective shared DMRS resource blocks and the respective data resource blocks are associated with a shared precoding scheme;
performing a channel estimation of the wireless channel based on the shared DMRS carried in the plurality of resource blocks; and
decoding the set of control resource blocks and the data blocks based on the channel estimation.

13. The method of claim 12, wherein the shared DMRS resource blocks are included in a downlink DMRS or an uplink DMRS.

14. The method of claim 12, further comprising determining a location of the shared DMRS for the search space based at least in part on a system bandwidth.

15. A device for wireless communication, comprising:
a memory; and
at least one processor coupled to the memory, the memory and the at least one processor configured to:
determine to constrain a set of control resource blocks to a quantity of layers that is common to the set of control resource blocks and data resource blocks;
determining a shared demodulation reference signal (DMRS) configuration for a plurality of resource blocks based on determining to constrain the set of control resource blocks to the quantity of layers that is common to the set of control resource blocks and the data resource blocks, the plurality of resource blocks including the set of control resource blocks including resource elements carrying control information, the data resource blocks including resource elements carrying data, and shared DMRS resource blocks including resource elements carrying a shared DMRS, the shared DMRS configuration configuring the shared DMRS resource blocks such that each control resource block of the set of the control resource blocks overlaps in frequency with a shared DMRS resource block of the shared DMRS resource blocks and at least one data resource block of the data resource blocks, wherein the set of control resource blocks, the respective shared DMRS resource blocks and the respective data resource blocks are associated with a shared precoding scheme, and wherein the shared DMRS resource blocks are configured to enable a receiver to perform a channel estimation and to decode the set of control resource blocks and the data resource blocks based on the shared DMRS; and
transmit the plurality of resource blocks based on the shared DMRS configuration.

16. The device of claim 15, wherein the shared DMRS resource blocks are included in a downlink DMRS or an uplink DMRS.

17. The device of claim 15, wherein the control resource blocks are defined for at least one channel.

18. The device of claim 15, wherein the set of control resource blocks is not associated with any other DMRS or is associated with a sparse DMRS, and wherein the control resource blocks further include a second set of control resource blocks carrying different control information than the control information carried in the set of control resource blocks, the second set of control resource blocks being associated with a different DMRS than the shared DMRS.

19. The device of claim 15, wherein the set of control resource blocks are a subset of the data resource blocks.

20. The device of claim 15, wherein the set of control resource blocks and the data resource blocks are associated with a common quantity of layers.

21. The device of claim 15, wherein a quantity of layers or codewords for the set of control resource blocks is a subset of a quantity of layers or codewords of the data resource blocks.

22. A device for wireless communication, comprising:
a memory; and
at least one processor coupled to the memory, the memory and the at least one processor configured to:
determine a location of a shared demodulation reference signal (DMRS) for a search space based at least in part on a resource location of a search candidate for the search space;
receive a plurality of resource blocks over a wireless channel, the plurality of resource blocks including control resource blocks including resource elements carrying control information, data resource blocks including resource elements carrying data, and shared DMRS resource blocks including resource elements carrying the shared DMRS, the shared DMRS resource blocks being configured such that each control resource block of a set of the control resource blocks overlaps in frequency with a shared DMRS resource block of the shared DMRS resource blocks and at least one data resource block of the data resource blocks, wherein the set of control resource blocks, the respective shared DMRS resource blocks and the respective data resource blocks are associated with a shared precoding scheme;

perform a channel estimation of the wireless channel based on the shared DMRS carried in the plurality of resource blocks; and decode the set of control resource blocks and the data blocks based on the channel estimation.

23. The device of claim 22, wherein the shared DMRS resource blocks are included in a downlink DMRS or an uplink DMRS.

24. The device of claim 22, wherein the memory and the at least one processor are further configured to determine a location of the shared DMRS for the search space based at least in part on a system bandwidth.

* * * * *